United States Patent
Goguen et al.

(10) Patent No.: US 6,665,273 B1
(45) Date of Patent: Dec. 16, 2003

(54) DYNAMICALLY ADJUSTING MULTIPROTOCOL LABEL SWITCHING (MPLS) TRAFFIC ENGINEERING TUNNEL BANDWIDTH

(75) Inventors: Robert Goguen, Acton, MA (US); George Swallow, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/482,968

(22) Filed: Jan. 11, 2000

(51) Int. Cl.[7] .............................................. H04L 12/28
(52) U.S. Cl. ...................................... 370/252; 370/377
(58) Field of Search ................................ 370/412, 389, 370/469, 252, 377

(56) References Cited

U.S. PATENT DOCUMENTS

| | | | |
|---|---|---|---|
| 5,623,492 A | | 4/1997 | Teraslinna .................. 370/397 |
| 5,953,338 A | * | 9/1999 | Ma et al. .................... 370/377 |
| 6,262,989 B1 | * | 7/2001 | Gemar et al. ............... 370/412 |
| 6,519,254 B1 | * | 2/2003 | Chuah et al. ............... 370/389 |

FOREIGN PATENT DOCUMENTS

| GB | 2374243 A | * | 9/2002 | ........... H04L/12/24 |
|---|---|---|---|---|
| GB | 2374243 A | * | 10/2002 | ........... H04L/12/24 |

OTHER PUBLICATIONS

"Multiprotocol Label Switching," Packet Magazine Archives, Second Quarter 1999.

Davie, "Multiprotocol Label Switching—Service Providers to Benefit from New Functionality," Packet Magazine Archives, Second Quarter 1999.

"Multiprotocol Label Switching (MPLS) Traffic Engineering," Cisco Systems, Inc., 1989.

* cited by examiner

Primary Examiner—Salvatore Cangialosi
(74) Attorney, Agent, or Firm—Cesari and McKenna, LLP

(57) ABSTRACT

A method and apparatus for an improved Multiprotocol Label Switching (MPLS) system for traffic engineering is described. The improved MPLS system determines the actual traffic flow within a traffic engineering (TE) tunnel and dynamically adjusts the bandwidth to reflect the actual traffic flow. The actual traffic flow may be ascertained by accessing an average byte counter, which keeps track of the traffic flowing through the TE tunnel. Once the actual traffic flow is known the bandwidth is updated in accordance with the actual traffic flow. This allows the MPLS system to automatically maximize the bandwidth resources while minimizing operator intervention.

45 Claims, 10 Drawing Sheets

DYNAMICALLY ADJUSTING MULTIPROTOCOL LABEL SWITCHING (MPLS) TRAFFIC ENGINEERING TUNNEL BANDWIDTH

BACKGROUND OF THE INVENTION

1. Field of the Invention

The present invention is related to networking systems and in particular, to maximizing bandwidth resources in a Multiprotocol Label Switching (MPLS) system.

2. Background

Internet is the widely accepted medium for the interchange of information. Government, business entities and other organizations routinely use the Internet to provide and receive information, and the number of users is increasing. To support such increased usage, networks and supporting devices have become larger and more complex. However, even with the proliferation of such devices and network complexity, an Internet service provider (ISP) must still provide reliable service that can withstand link or node failures while maintaining high transmission capacity. Additionally, the devices used in the network links and the intermediate devices such as switches and routers are expensive items and thus should be used to their maximal capacity. Traffic engineering is one solution that enables ISPs to maximize device capacities while providing network resiliency.

Traffic engineering (TE) is a term that refers to the ability to control traffic flow in a network (notwithstanding a path chosen by a routing protocol) with a goal of reducing congestion thereby getting the most use out of the available devices. For example, a network topology typically has multiple paths between two points. However, a routing protocol will usually select a single path between the two points regardless of the load on the links that form the path. This may cause certain paths to be congested while the other paths are under-utilized. Traffic engineering facilitates load balancing or load sharing among the paths thereby enabling the network to carry more traffic between two points.

Multiprotocol Label Switching (MPLS) is a technology that, among others, allows traffic engineering to be performed. The principle behind MPLS, as its name implies, is using labels to switch packets along a path. This is in contrast to a routing lookup table in which the longest lookup on an Internet Protocol (IP) header is performed. A label distributing mechanism based on a Label Distribution Protocol (LDP) or existing protocols such as Resource Reservation Protocol (RSVP), which has been enhanced, allows for the assignment and distribution of the labels. RSVP is a protocol for reserving network resources to provide Quality of Service guarantees to application flows. Various control modules are responsible for facilitating and maintaining traffic engineering as well as for maintaining other relevant control information.

Referring to FIG. 1, an exemplary MPLS based router 100, among others, may include:

- a routing module 110 that constructs a routing table 112 using conventional routing protocols, preferably a linked-state Interior Gateway Protocol (IGP) such as Intermediate System to Intermediate System (IS-IS), Open Shortest Path First (OSPF) and so forth;
- a traffic engineering (TE) module 120 that enables explicitly specified label switched paths (LSPs) to be configured throughout a network using a TE topology database and a TE path calculation module, as will be described, which preferably in conjunction with RSVP and a label allocation module (not shown), assigns labels 122 to routes and supplements the above routing table with those labels to be further described with respect to FIG. 2;
- a TE path calculation module 130 that calculates the "best" path for the LSPs based on resources required by the path and the available resources in the network;
- a TE topology database 140 that receives and stores information on link states of the network and available resources via the IGP assuming that it is a linked state IGP,
- a TE link management module 150 that keeps track of and maintains all LSPs that have been set up; and
- supporting protocols such as RSVP 160 and an IGP 170 with extensions for global flooding of resource information.

Explicitly routed LSPs are referred to as TE tunnels. FIG. 2 illustrates the operation of an MPLS system supporting unicast TE tunnel routing. Using an IGP and RSVP, each router on a path of a TE tunnel builds a routing table supplemented with labels. For this configuration, each router has its resource information flooded to the appropriate IGP link state database and accepts RSVP signaling requests. Generally, when a TE tunnel is being established, assuming it to be a dynamic path, the TE module sets the resource requirement of the path based on operator input or default. The TE path calculation module calculates a constrained short path from the "head-end" router to the "tail-end" router based on resources required to setup the path, which in this instance is path 200. RSVP then signals the routers along the path 200 that a setup is being performed. During setup, the routers on the path need to agree on the labels to be used for the packets traveling along the path. This label allocation procedure may also be performed by RSVP in that its signaling and the resource reservation features may be used to construct the TE tunnels. RSVP also requests labels from the label allocation module; these labels required for constructing the TE tunnel.

The TE module using RSVP causes router R1 at the head-end of the tunnel to send a setup request to the router Rn at the tail-end of the tunnel. The setup request travels along the calculated path 200 until it reaches the tail-end router Rn. Upon receipt of the setup request, the router Rn returns a setup reply to router R1 over the path 200 traveled by the setup request. When router Rn-1 receives the setup reply, it requests a label from the label allocation module, which allocates a label LRn-1 for the segment of the path. Router Rn-1 then establishes a mapping in its routing table between the label LRn-1 and the path to router Rn. Router Rn-1 then attaches the label LRn-1 to the setup reply and sends it "upstream" to the previous "hop" router Rn-2 on the path. In response to receiving the setup reply, Router Rn-2 requests and receives a label LRn-2, which it uses to allocate for that segment of the path and establishes a mapping in its routing table between the label LRn-2 and the path to router Rn-1. Router Rn-2 then replaces the label LRn-1 on the setup reply with its label LRn-2 and sends it to the next router Rn-3 on the path. Likewise, Router Rn-3, upon receiving the setup reply, requests and allocates a label LRn-3 for the segment of the path and establishes a mapping between the label LRn-3 and the path to router Rn-2. Router Rn-3 then replaces the label on the setup reply with its own label and sends the setup reply further upstream. This process is repeated for each router along the path 200 until the head-end router R1 receives the setup reply. In this instance, the setup reply will have a label LR2 attached thereto by the router R2 on the path. Router R1 then adds an entry to its routing table using the label LR2 which functions as an initial label for entering the TE tunnel created for the path.

Once the TE tunnel has been established, the TE module notifys the IGP as to the IP address of the TE tunnel. Once notified, the IGP can route packets through the TE tunnel using the IP address. In instances where the IGP is load balancing between a TE tunnel and a regular path, IGP may use a "flow" method or a "round-robin" method to load balance between the two paths. The flow method is really a load sharing method and may be performed in a following manner: a portion of a source address and a destination address of a packet may be combined and hashed to generate one of a pseudo-random range of numbers. The value of the number determines which path the packet is to follow. Assuming the packet is routed to the TE tunnel, the packet transmission mechanism through the tunnel is based on label switching.

For example, when router R1 receives a packet, it performs a conventional longest match lookup on the IP header. If the lookup indicates a label, router R1 recognizes that the packet is to be transmitted through the TE tunnel and affixes the initial label on the packet. After the packet is labeled, subsequent routers in the tunnel transmit the packet using only labels, that is, each router switches the label of an incoming packet with its label prior to sending the packet. The incoming label received by a router is used as an index to the routing table for the "next hop" information. Note that the label switching mechanism operates similar to that of a layer two switching mechanism. In this manner, other than the head-end router, no longest match lookup is performed by subsequent routers.

FIG. 3 gives an example of how the MPLS TE system may be used to solve traffic congestion while maximizing resources. As shown, there are two paths from router C to router E. Typically, router C selects the shortest path to router E resulting in all traffic being channeled through router D. Thus, the resulting traffic volume creates congestion in that path while the path though router F and router G remains underloaded. To maximize performance of the overall network, it is desirable to shift some of the traffic from the congested path to the under-loaded path. One previous attempt to address the problem sets the cost of the path of the routers C-D-E equal to the cost of the path of the routers C-F-G-E. While such a method may be feasible in a simple network, it is cumbersome if not impossible in a network of complex topology. By using explicitly routed paths, MPLS traffic engineering is a more straightforward and flexible way of addressing this problem. For example, the traffic engineering module can establish a label-switched path from routers A-C-D-E and another label-switched path from routers B-C-F-G-E. By defining policies that determine which packets are to follow these paths, traffic flow across a network, even one of complex topology, can be managed.

"Constraint-based routing" is a technique that allows minimal operator intervention in setting up the TE tunnels. Constrained-based routing may be supported by the TE module and the TE path calculation module as described above. Prior to constraint-based routing, the operator configured the TE tunnels by specifying a sequence of hops that the path should follow. However, a problem concerning this form of traffic engineering is that considerable network configuration and re-configuration is required. Under constraint-based routing, an operator merely specifies the amount of traffic that is expected to flow in the TE tunnel. The MPLS TE system then calculates the paths based on constraints suitable for carrying the load and establishes explicit paths. These paths are established by considering resource requirements and resource availability, instead of simply using the shortest path. Examples of constraint factors considered by the MPLS TE system are bandwidth requirements, media requirements, a priority versus other flows and so forth.

Below is a table that lists a set of commands that may be used to configure an MPLS TE tunnel based on constraint-based routing.

| Step | Command | Purpose |
| --- | --- | --- |
| 1. | Router (config) # interface tunnel | Configure an interface type and enter interface configuration mode. |
| 2. | Router (config-if) # tunnel destination A.B.C.D | Specify the destination for a tunnel |
| 3. | Router (config-if) # tunnel mode mpls traffic-eng | Set encapsulation mode of the tunnel to MPLS traffic engineering. |
| 4. | Router (config-if) # tunnel mpls traffic-eng bandwidth bandwidth | Configure bandwidth for the MPLS traffic engineering tunnel |
| 5. | Router (config-if) # tunnel mpls traffic-eng path-option 1 explicit name boston | Configure a named IP explicit path |
| 6. | Router (config-if) # tunnel mpls traffic-eng path-option 2 dynamic | Configure a backup path to be dynamically calculated from the traffic engineering topology database. |

One particular aspect of configuring an MPLS TE tunnel is that the bandwidth of the tunnel needs to be specified as shown in the following exemplary commands:

configure terminal
interface tunnel 1
   tunnel destination 17. 17. 17. 17
   tunnel mode mpls traffic-eng
   tunnel mpls traffic-eng autoroute announce
   tunnel mpls traffic-eng bandwidth 100
   tunnel mpls traffic-eng priority 1 1
   tunnel mpls traffic-eng path-option 1 dynamic Stated differently, the operator specifies the amount of bandwidth a TE tunnel requires prior to enabling the tunnel, as this is a factor in constraint-based routing. However, where the traffic flow constantly changes within the tunnel, such bandwidth constraints may not necessarily result in efficient usage of the routers, an example which is shown below.

FIG. 4 shows various routers connected together by MPLS TE tunnels. Once the operator has configured the TE tunnels, the TE module along with the link management module, establish and maintain the tunnels. Tunnel paths are calculated at the tunnel head based on the required resources and the available resources, such as bandwidth. Router C is an example in which several TE tunnels enter and exit the router. By carefully monitoring the traffic flow, the operator may finely balance the allocation of bandwidth to the TE tunnels in view of the available bandwidth of the router. If the operator configures the tunnels based on peak traffic flow, it is possible that the aggregate peak traffic flow of the tunnels may be greater than the bandwidth of the router. This forces the operator to configure one or more TE tunnels elsewhere to share the traffic load. In certain instances, more routers may be needed to provide the load share. In many instances, however, it is quite possible that the peak traffic in the tunnels occurs at different time intervals and the router C has sufficient bandwidth to handle the traffic flow between the plurality of TE tunnels. In a network of complex topology where traffic patterns are constantly changing, it is generally difficult for the operator to predict the traffic flow and adjust the bandwidth of the individual tunnels accordingly. Further, because of the numerous routers involved, it is generally burdensome for the operator to continuously monitor traffic patterns and update the various bandwidth constraints.

SUMMARY OF THE INVENTION

The invention comprises an improved Multiprotocol Label Switching (MPLS) system within a network device for traffic engineering that determines an actual traffic flow within a traffic engineering (TE) tunnel and dynamically adjusts the bandwidth to reflect the actual traffic flow. The actual traffic flow may be ascertained by accessing an average byte counter in the physical link management module that keeps track of bytes flowing through the TE tunnel. The TE tunnel configuration information is usually stored at the head-end network device of the tunnel. According to one example, the improved MPLS system signals a path from the head-end network device to the tail-end network device using the adjusted bandwidth as one of the constraints for establishing the path. If the new path is different from the previous path then the previous path is "torn down" and replaced by the new path as the TE tunnel.

As an example, the MPLS system, among others, comprises a TE module, a routing module, a TE path calculation module, a TE topology database and a TE link management module. The TE module is responsible for initiating a tunnel setup once the tail-end router and the bandwidth have been selected (assuming the current MPLS system is at the head router) under "constraint-based" routing. Using the TE topology database and the TE path calculation module, a constrained path calculation is performed to determine a path for the tunnel. Once tunnels are set up in the router, the TE link management module keeps track of the status of the tunnels such as whether a tunnel is being maintained or is being "torn down". The TE module supplements the routing table built by the routing module with labels to be used for label switching in a particular tunnel. The link management module keeps track of all tunnels through the router including the resources used such as allocated bandwidth and available bandwidth. In addition, there is a configuration table, which is stored in a memory and contains tunnel configurations specified by the operator or specified by default. Configuration information may include bandwidth requirements, media requirements, a priority verses other flows and so forth. The router may also have a physical link management module to allocate available resources in accordance with the configuration table. The physical link management module includes byte counters for each TE tunnel set up to monitor the traffic flow through the tunnel.

The improved MPLS system uses the byte counters to determine the actual traffic flow through the configured TE tunnels and dynamically re-configures the required bandwidth to reflect the traffic flow. This may be performed as a sub-module within the TE link management module or as a separate "autobandwidth" module. The autoband-width module has a global timer, which is global to the networking device. The global timer may be accessed by a supplemental MPLS command "auto-bw timer", which at predetermined intervals set by the operator or by default, causes the global timer to take the average byte count for each tunnel for that interval and may store each average count in a register. Another supplemental MPLS command "auto-bw" determines the frequency at which the byte count for a particular tunnel is to be sampled to determine if a bandwidth adjustment is required. Each enabled "auto-bw" command is specific to an established TE tunnel. If a tunnel requires a bandwidth adjustment, the auto-bw command causes the autobandwidth module to update the bandwidth. This may be in the form of the autobandwidth module notifying the TE module that the bandwidth needs to be changed and the TE module changing the configuration table and performing a setup procedure. Alternatively, the autobandwidth module may change the configuration table and notify the TE module of the change causing the TE module, in turn, to perform the setup procedure. The features described above allow for bandwidth resources of a network to be efficiently utilized thereby maximizing its capacity while minimizing operator intervention. Further details and advantages will be apparent in the detailed description to follow.

BRIEF DESCRIPTION OF THE DRAWINGS

The invention description below refers to the accompanying drawings, of which.

DETAILED DESCRIPTION OF AN ILLUSTRATIVE EMBODIMENT

The present invention pertains to dynamically adjusting a bandwidth of a Multi-protocol Label Switching (MPLS) system traffic engineering (TE) tunnel based on actual traffic flow through the tunnel. Generally, the network devices using the MPLS system keep track of byte counts through the TE tunnel. Knowledge of the actual traffic flow through a tunnel enables dynamic adjustment of the bandwidth, which in turn allows for allocation of sufficient resources to service the traffic. In one instance, excess bandwidth is reallocated elsewhere by the network devices. The invention is now described using an illustrative embodiment to aid in the understanding of the invention and should not be construed as limitations to the invention.

Figure 5:
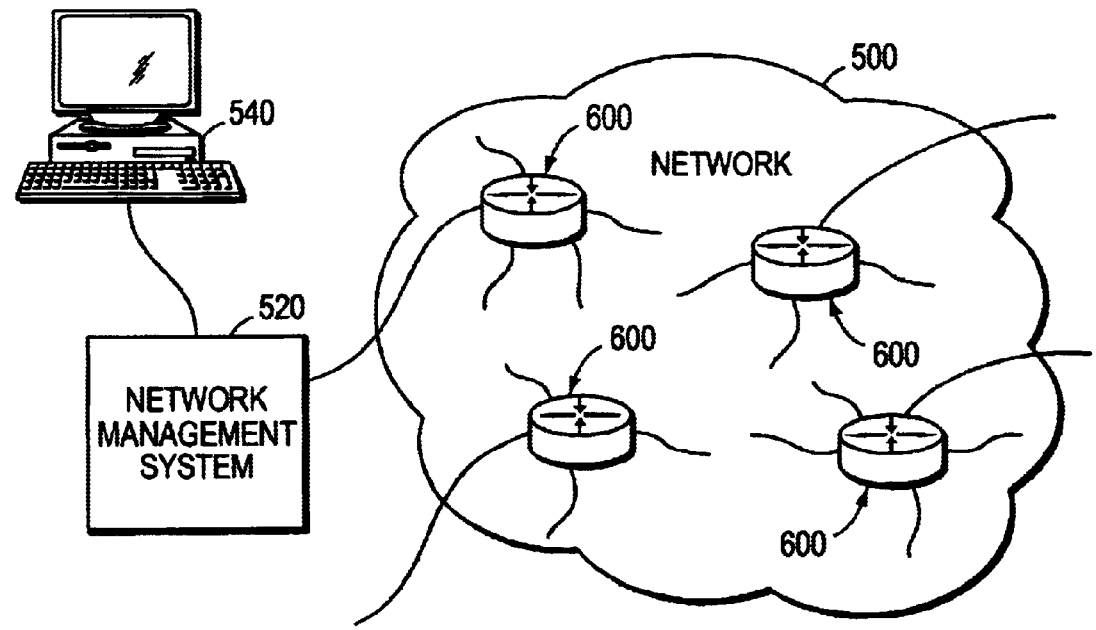
FIG. 5 is a network that is managed by a network management system.

As shown in FIG. 5, a network 500 is generally controlled by a network management system 520 that monitors and controls the network. The network management system 520 implements/executes one or more algorithms to communicate and interact with various network devices within the network. The network devices, in turn, provide feedback to the network management system 520 as to the status of the network. The feedback information provides the network management system 520 with an overview of the network structure, addresses and labels assigned to each device, and attributes of the devices and links within the network among others. A monitor 540 allows an operator to interface with the network to perform network management tasks. Such tasks may involve setting up operation parameters of the network devices, collecting statistics on communication and activities of the network, requesting network status information, monitoring traffic flow and so forth.

Figure 6:
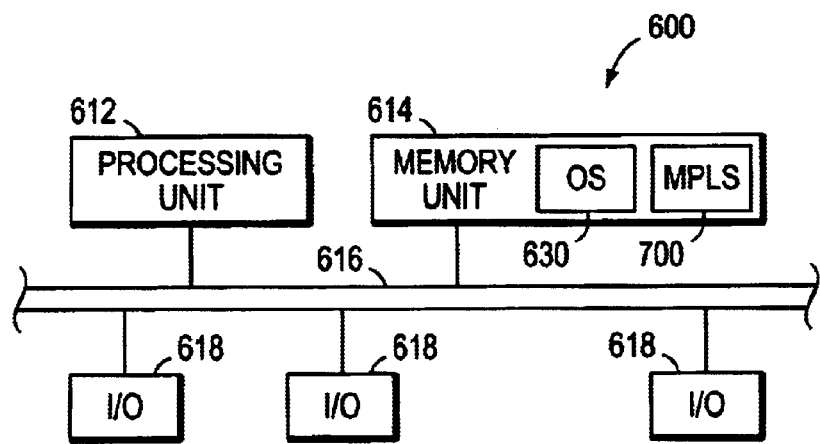
FIG. 6 is a network device using an MPLS system.

FIG. 6 illustrates a network device 600 such as a router. The router comprises a processing unit 612 and a memory unit 614 coupled together by a bus 616. Further coupled to the bus may be a plurality of input/output (I/O) interfaces 618 that interacts with other routers and network devices in the network. In one example, an operating system (OS) 630 resides in the memory unit 614 along with an MPLS system 700 as processor executable instructions. Together, they facilitate the operation of the router when executed by the processing unit 612. The memory unit 614 may be a volatile memory such as a Dynamic Random Access Memory (DRAM). The MPLS system 700 may also reside in a non-volatile memory such as a Read Only Memory (ROM) or a Flash memory. Further, the MPLS system may be stored in a storage medium such as magnetic or optical disks. Collectively, the mentioned memories, storage mediums and the like will be referred to as a processor readable medium. Additionally, portions of the MPLS system may be configured in hardware such as application specific integrated circuit (ASIC).

Figure 7:
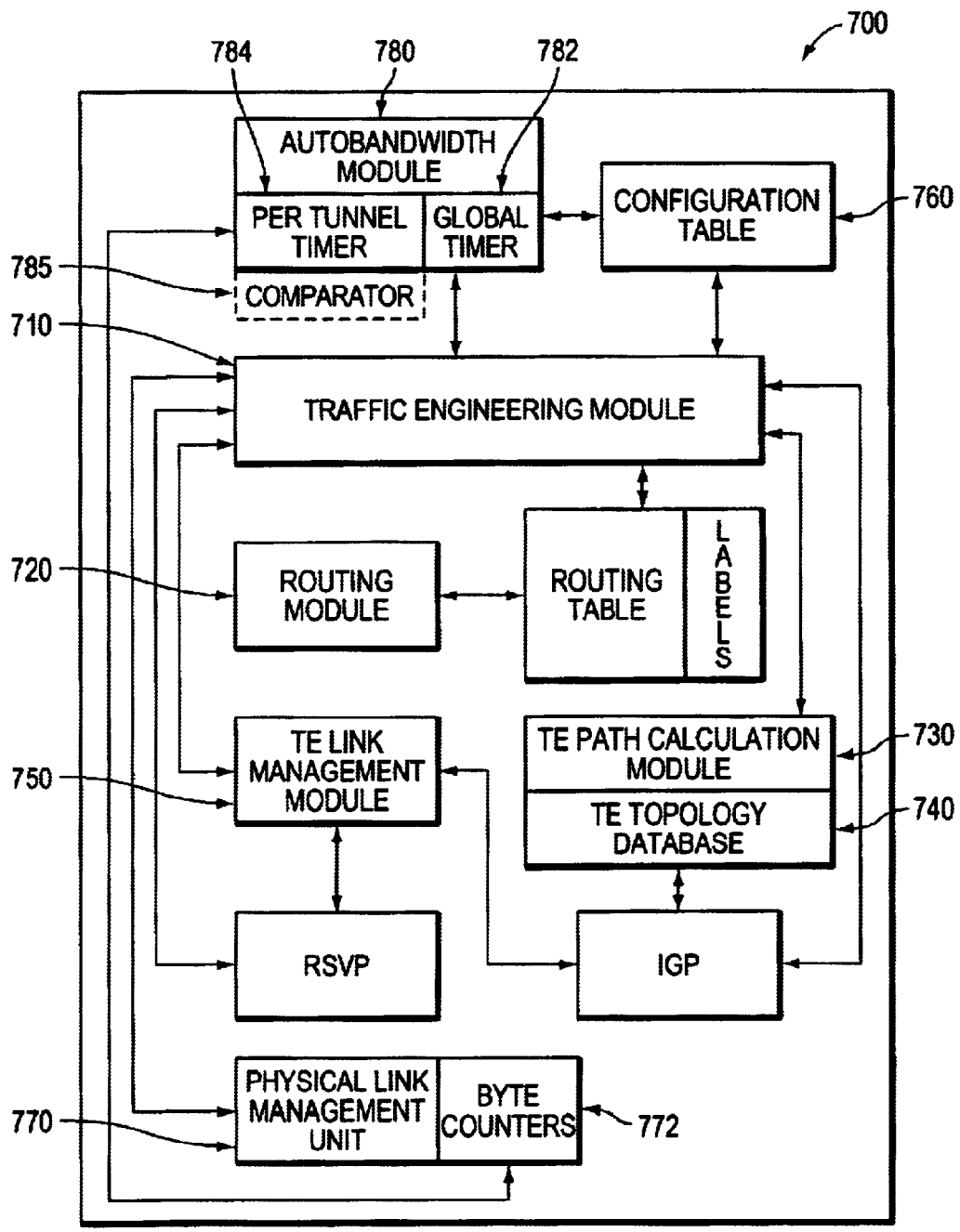
FIG. 7 is an improved MPLS system in accordance with an embodiment of the invention.

The exemplary MPLS system 700 of FIG. 7, among others, comprises a traffic engineering (TE) module 710, a routing module 720, a TE path calculation module 730, a TE topology database 740 and a TE link management module 750. As an overview, the TE module 710 is responsible for initiating a tunnel setup once the tail-end router and the bandwidth have been selected (assuming the current MPLS system is at the head router) under constraint-based routing. Using the TE topology database 740 and the TE path calculation module 730, a constrained path calculation is performed to determine a path for the tunnel. Once tunnels are set up in the router, the TE link management module 750 keeps track of the status of the tunnels such as whether a tunnel is being maintained or is being "torn down". The TE module 710 supplements the routing table built by the routing module 720 with labels 724 to be used for label switching in a particular tunnel. The link management module 750 keeps track of all tunnels through the router including the resources used such as allocated bandwidth and available bandwidth. In addition, there is a configuration table 760, which is stored in a memory and contains tunnel configurations specified by the operator or specified by default. Configuration information may include bandwidth requirements, media requirements, a priority verses other flows and so forth. The router 700 causes the physical link management unit 770 to allocate available resources in accordance with the configuration table 760. The physical link management unit 770 includes byte counters 772 for each tunnel to monitor the traffic flow through the tunnel.

Figure 1:
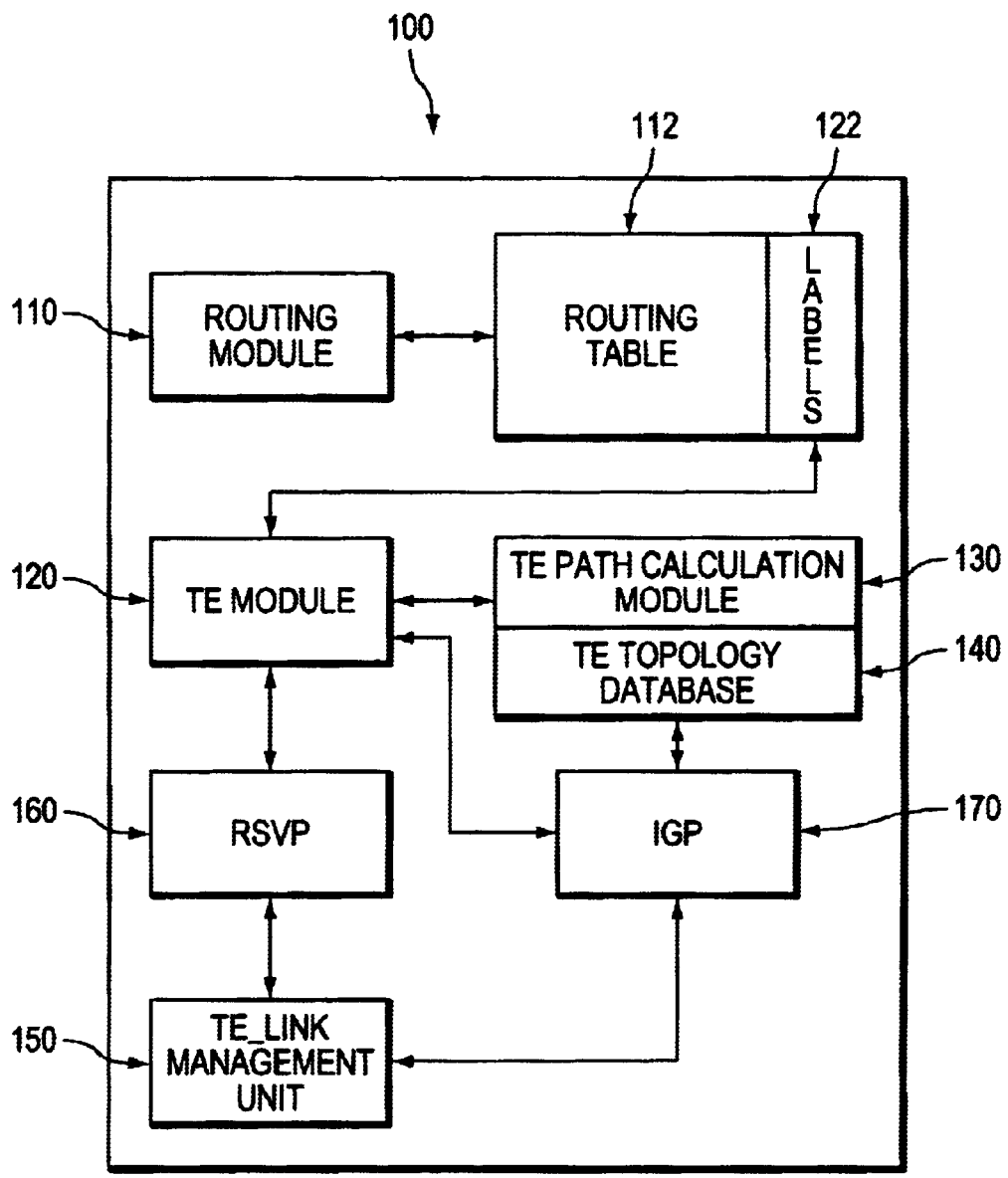
FIG. 1 is a router supporting a Multiprotocol Label Switching (MPLS) system.
Figure 2:
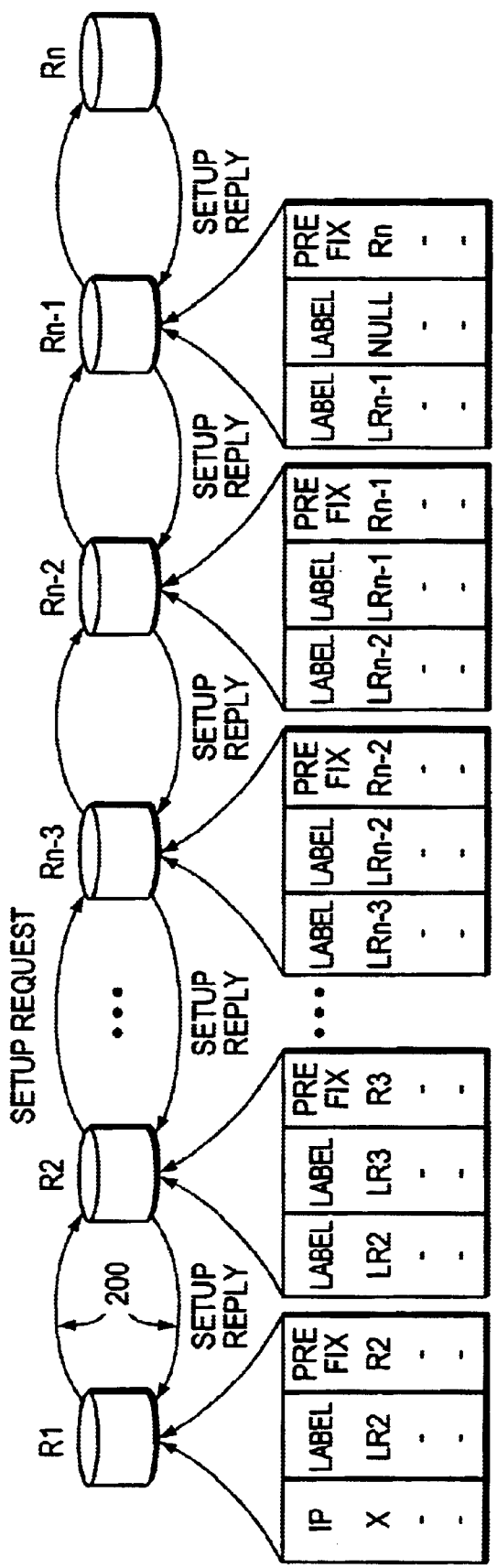
FIG. 2 is an MPLS system supporting unicast traffic engineering (TE) tunnel routing.
Figure 3:
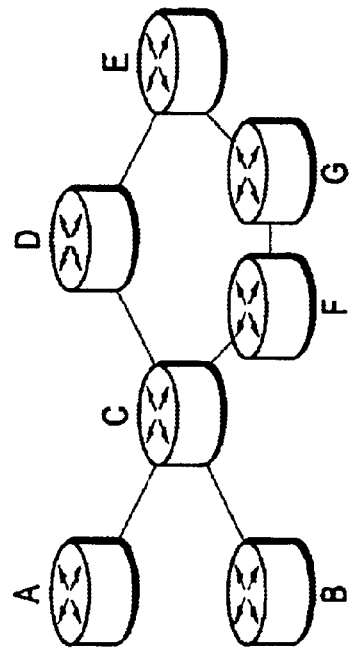
FIG. 3 is a network with a plurality of routers in which TE tunnels may be used to solve traffic congestion and to maximize resources.
Figure 4:
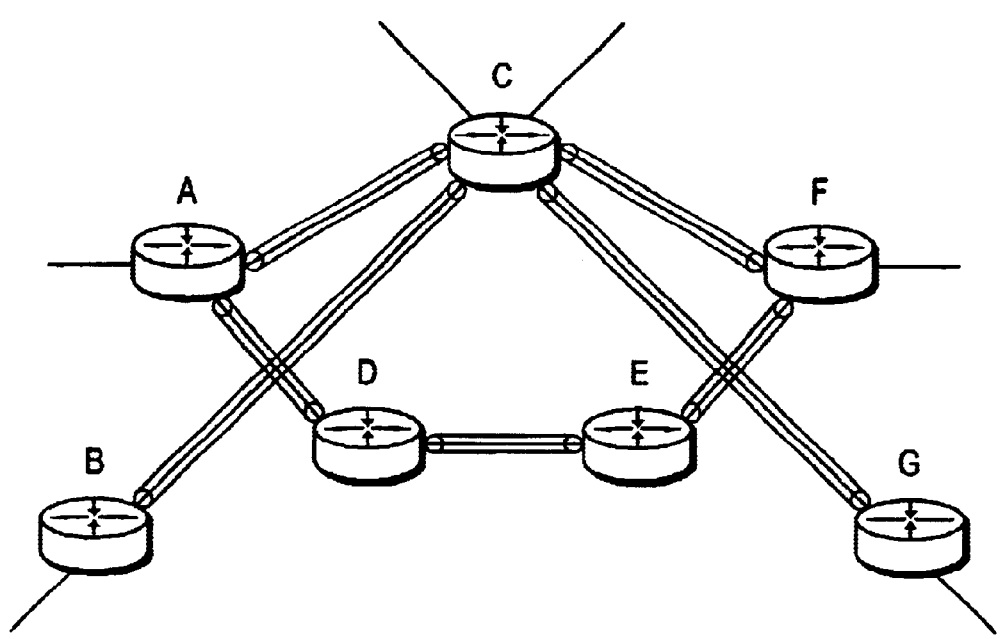
FIG. 4 is a network with a plurality of label switching routers (LSRs) interconnected with TE tunnels.

According to the invention, an improved MPLS system determines the actual traffic that flows through the configured TE tunnels and dynamically re-configures the tunnel bandwidth to reflect the traffic flow. The TE module 710 notified of the change, initiates a path setup procedure to find a path that is able to accommodate the adjusted bandwidth. If the calculated path is the same as the current path, the setup procedure may terminate and the current path is used with the new adjusted bandwidth. Alternatively, the setup procedure is initiated as described with respect to FIG. 2, where the newly established tunnel that meets the adjusted bandwidth and other constraints in the configuration table, replaces the old tunnel and the old tunnel is torn down. The actual traffic may be determined by accessing the byte counters 772 kept within the physical link management module 770.

The monitoring of the byte counters may be performed by a sub-module within the link management module 750 or as shown in the figure, it may be performed by a separate "autobandwidth" module 780. The autobandwidth module has a global timer 782, which is global to the router. At predetermined intervals set by the operator or by default, the global timer 782 triggers a scan of the byte counters associated with the TE tunnels setup in the router. The scan may be performed by the processing unit 612 or by a separate logical unit within the router. Scanning generally includes determining an average byte count for that interval for each tunnel and storing each average byte count in a register (such as a memory unit 614 in FIG. 6). If there is a previously stored average byte count in a register, then the current average byte count is compared with the previously stored byte count. In one example, the greater of the two values is stored in the register. In this manner, the peak average byte count is stored in the register.

In one embodiment, the autobandwidth module 780 further includes a per tunnel timer 784 that is associated with a particular tunnel and triggers a reading of the register at another predetermined interval to retrieve the stored peak average byte count. The reading may be performed by the processing unit or by the separate logical unit. The retrieved peak average byte count is used to compare with the current bandwidth of the tunnel and if an adjustment is required, the autobandwidth module causes the bandwidth to be modified. This may be in the form of the autobandwidth module notifying the TE module that the bandwidth needs to be changed and the TE module changing the configuration table and performing a setup procedure. Alternatively, the autobandwidth module may change the configuration table and notify the TE module of the change which in turn performs the setup procedure. Once a reading of the register has taken place, the register is reset and the above mentioned procedure is repeated. Access to the autobandwidth module 780 may be performed by supplemental MPLS commands, as will be described.

Note that the reading need not be performed at predetermined intervals, but rather, it may be performed according to an event. For example, instead of a timer, the autobandwidth module 780 may have a comparator 785 that compares the difference between the current set bandwidth and the value of the average byte counter with a threshold value. If the absolute value of the difference exceeds the threshold, the autobandwidth module causes the TE module to adjust the bandwidth. If the difference is a positive value, this indicates to the autobandwidth module that the bandwidth needs to be upwardly adjusted. Conversely, if the difference is a negative, the bandwidth is downwardly adjusted.

Figure 8A:
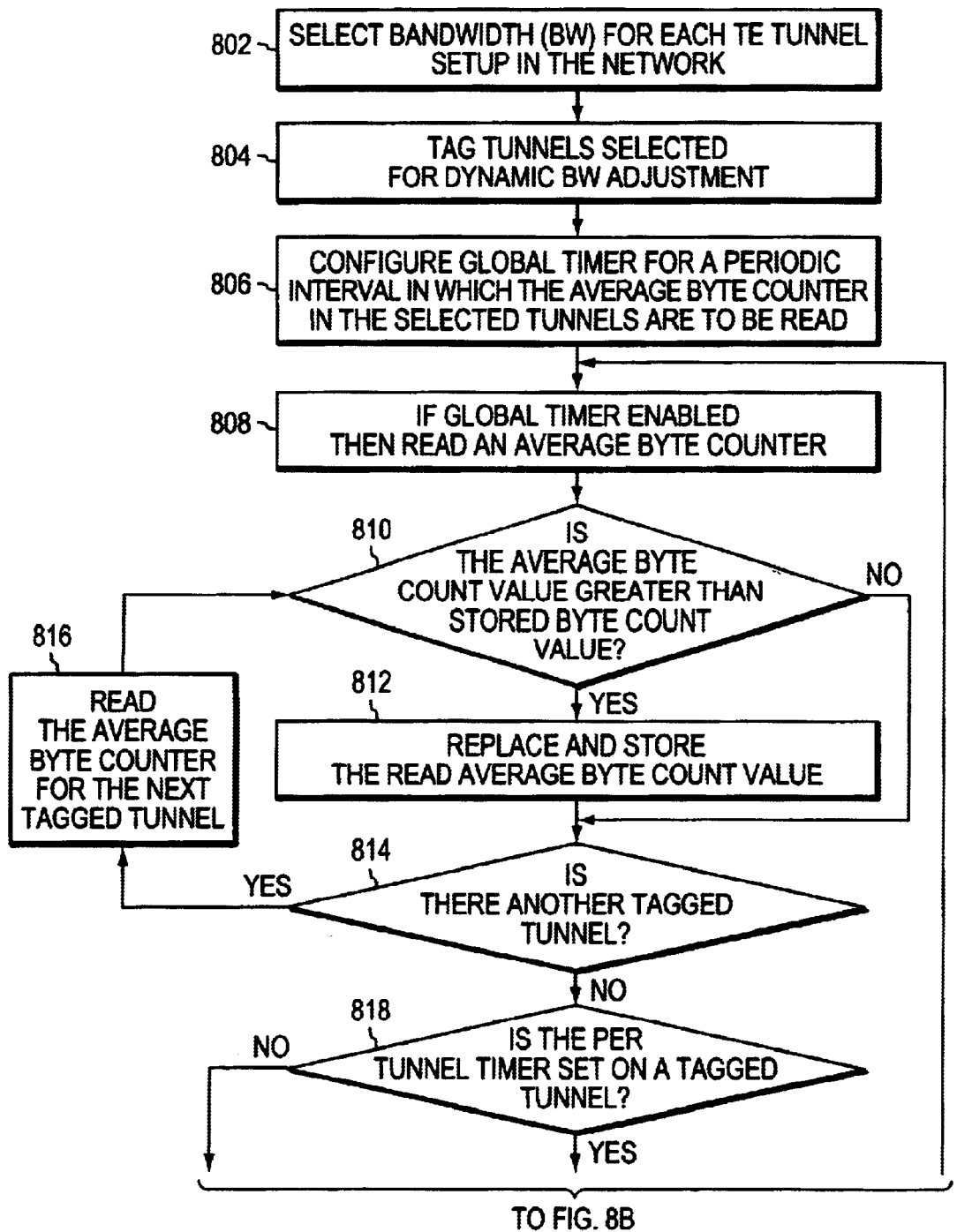
FIG. 8 is a flow chart showing a method for dynamically adjusting bandwidth of TE tunnels in accordance with an embodiment of the invention.
Figure 8B:
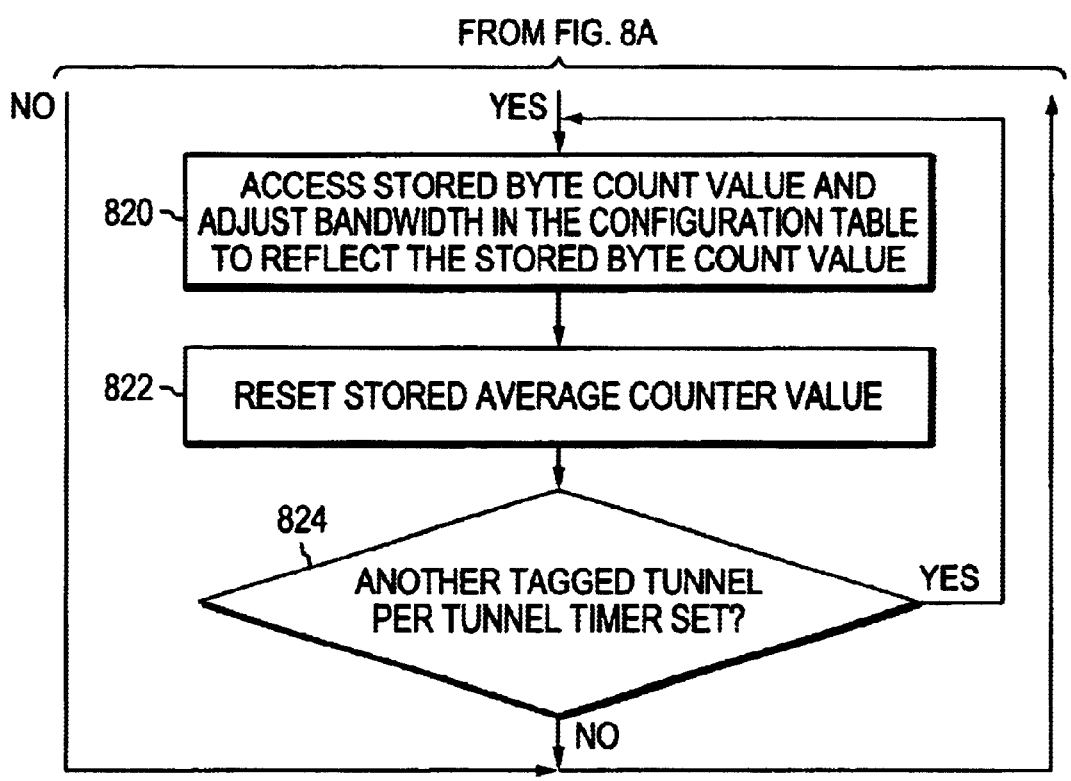

Referring to the flowchart in FIG. 8, in block 802, a bandwidth for each configured TE tunnel is specified in accordance with constraint-based routing. The bandwidth may be specified individually by an operator or the bandwidth may be assigned to the tunnels by an algorithm based on a predetermined approximated traffic flow expected to flow in the configured tunnels. In block 804, the tunnels to be selected for dynamic bandwidth adjustment are tagged with a tunnel flag. The tagging may be performed using "auto-bw" command. The auto-bw command is a supplemented command to the existing MPLS commands and may be as follows:

tunnel mpls traffic-eng auto-bw {frequency <number>} {max-bw <kbs>} where the value {frequency <number>} is the time interval in which the register that stores the peak average byte count is read (per tunnel timer) and the value {max-bw <kbs>} defines the maximum bandwidth limit of the tagged tunnel. In block 806, a "global timer", which may be in a form of another supplemented MPLS command is configured to set the fixed interval in which each average byte counter associated with a tagged tunnel is scanned. An example of a global timer command is shown below:

mpls traffic-eng auto-bw timers {frequency <seconds>} where the value {frequency <seconds>} determines the periodic interval in which the global timer triggers a scan of all the tagged tunnels marked for dynamic bandwidth adjustment. For example, if {frequency <seconds>} is given a value 300, the global timer triggers a scan of the tunnels at five-minute intervals. Stated differently, once the global timer reaches the configured interval, the timer causes a processing unit to read the average byte counters. As reflected in blocks 808–816, using a conventional polling technique, the processing unit polls the auto-bw marked tunnels and for each marked tunnel, the stored counter value in a corresponding average counter is retrieved and compared with a previous counter value stored in a register. If the current counter value is greater than the previously stored counter value, then the greater value replaces the previously stored value in the register. Conversely, if the current counter value is less than the previously stored counter value, then the current value is ignored and the register maintains the previously stored value. In this manner, the peak average byte count is retained in the register. In block 818, a determination is made as to whether the per tunnel timer has reached the set time interval. If so, then in block 820, the auto-bw command accesses the TE tunnel configuration table and compares the stored counter value with the configured bandwidth. If the bandwidth of the tunnel requires adjustment, the autobandwidth module modifies the bandwidth setting in the configuration table thereby causing the bandwidth to be dynamically adjusted. Note that blocks 818–820 are applicable to all tagged tunnels, as reflected in block 824.

When the defined periodic interval expires in the per tunnel timer, the global timer resets the average counter value packet stored in the memory corresponding to that TE tunnel and the process is repeated.

Figure 9:
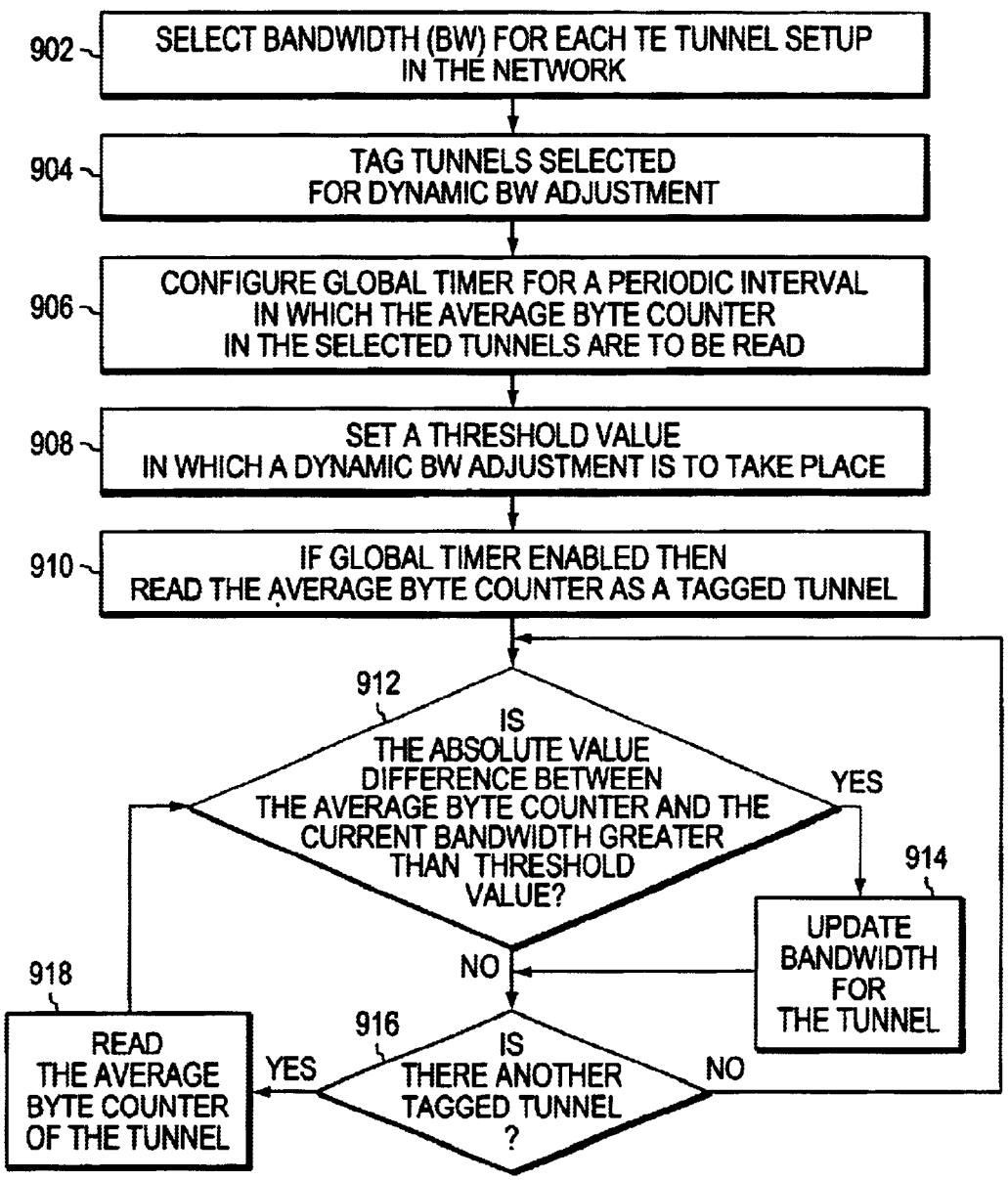
FIG. 9 is a flow chart showing a method for dynamically adjusting bandwidth of TE tunnels in accordance with an embodiment of the invention.

In FIG. 9, in blocks 902–904, a bandwidth is specified for the TE tunnels and the tunnels having bandwidth to be dynamically adjusted are tagged. In block 906, a global timer global to the router is set for a periodic interval in which the average byte counters of the tagged tunnels are to be read. In block 908, a threshold value is set, its significance which will become apparent. Note that one threshold may be set which is global for all the tagged tunnels, or else, each tagged tunnel may have an individual threshold value that is individually set. In block 910, when the global timer is set, the average byte counters corresponding to the tagged tunnels are read sequentially. For each tunnel, the value from the read counter is subtracted from the current bandwidth and the absolute difference is compared with the corresponding threshold value, assuming each tunnel has an individual threshold value. In block 914, if the absolute difference is greater than the threshold value, in this instance, the auto-bandwidth module will cause the bandwidth to be adjusted. If the difference is a positive value, the bandwidth will be upwardly adjusted and if the difference is a negative value, the bandwidth will be downwardly adjusted. Blocks 916–918 shows the sequential reading of the average byte counters of the tagged counters to determine if the bandwidth for the tunnels need to be adjusted.

Figure 10:
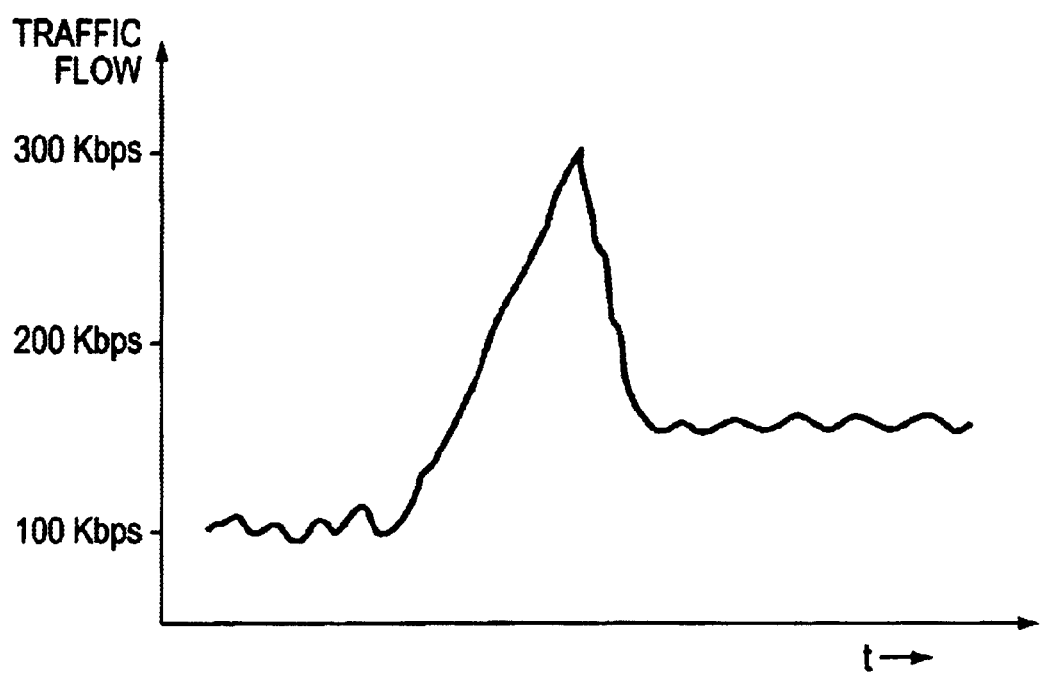
FIG. 10 is a graph showing a surge effect in a traffic flow of a TE tunnel.

FIG. 10 illustrates a situation in which surges in the traffic interfere with the dynamic bandwidth adjustment of a TE tunnel. Specifically, the byte counter may sample the surges in the traffic flow as actual bandwidth, which if implemented, consumes valuable resources. A surge may occur, for example, due to a link failure in another part of the network. As shown in the figure, the true bandwidth required for the tunnel is approximately 150 bytes/sec. However, due to the surge, the first few minutes indicate that the required bandwidth is approximately 300 bytes/sec. Accordingly, a damping effect is desired in instances where the tunnel is undergoing a settling transition, for example.

Figure 11:
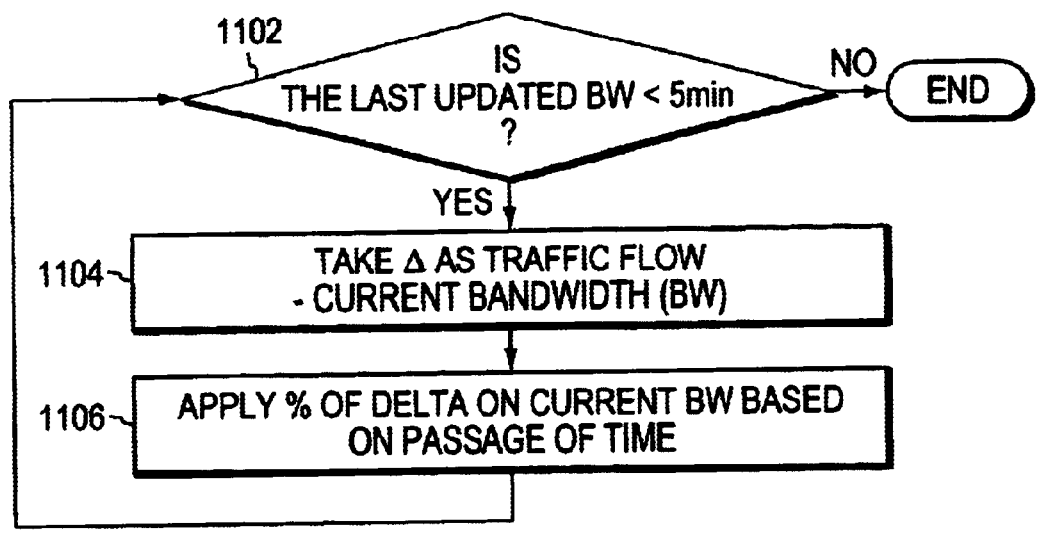
FIG. 11 is a flow chart showing a method for dynamically adjusting bandwidth of TE tunnels and accounting for surges within traffic in accordance with an embodiment of the invention.

The flow chart of FIG. 11 allows for surges as described above to be dampened. Initially, a determination is made as to whether the bandwidth of the tunnel has changed within the last five minutes in block 1102. If so, the difference (delta) of the sampled counter value and the current bandwidth is taken in block 1104. According to the illustrated embodiment, in block 1106, the following percentage of the delta is applied to the current bandwidth dependent on the passage of time since the bandwidth was last adjusted.

If one minute then 20% of the delta;
If two minutes then 40% of the delta;
If three minutes then 60% of the delta;
If four minutes then 80% of the delta; and
If five minutes or more then 100% of the delta.

Generally, higher percentage of delta is used if the passage of time is longer since the bandwidth was last adjusted. One of the reasons is that if the passage of time is long, then it is more likely that the delta is due to actual change in the traffic rather than the surge.

An improved MPLS system for dynamically adjusting TE tunnels based on actual traffic flow has been described. It will however be apparent that other variations and modifications may be made to the described embodiments, with the attainment of some or all of their advantages. Therefore, it is the object of the appended claims to cover all such variations and modifications that come within the true spirit and scope of the invention.

What is claimed is:

1. A method for controlling a Multiprotocol Label Switching (MPLS) traffic engineering (TE) system by dynamically adjusting a current set bandwidth of a TE tunnel, the method comprising the repetitive steps of:

setting an event in which a byte counter is to be read, the byte counter keeping track of an average traffic flow through the TE tunnel; wherein at the occurrence of the event, a processing unit performs the steps of:
    reading the byte counter to determine the average traffic flow of the TE tunnel;
    comparing the average traffic flow with the current set bandwidth of the TE tunnel;
    determining whether the current set bandwidth needs to be adjusted and if so, calculating an adjusted bandwidth and causing a TE module to perform the steps of, calculating a path that meets a requirement of the adjusted bandwidth; and setting the TE tunnel according to the calculated path.

2. The method of claim 1, wherein setting the event further comprises the steps of:

setting a global timer with a first periodic interval in which the byte counter is to be read, wherein at the end of each first periodic interval, the processing unit performs the steps of, retrieving a byte counter value from the byte counter;

comparing the byte counter value with a previously stored byte counter value in a memory;

storing the greater of the two values in the memory; and setting a per tunnel timer with a second periodic interval in which the byte counter is to be read, wherein at the end of second periodic interval, the processing unit performs the step of retrieving the byte counter value from the byte counter to be compared with the current set bandwidth.

3. The method of claim 1, wherein setting the event further comprises the steps of:

storing a threshold value in a memory;

setting a global timer with a first periodic interval in which the byte counter is to be read, wherein at the end of each first periodic interval, the processing unit performs the steps of, retrieving a byte counter value from the byte counter;

ascertaining a difference between the byte counter value and the current set bandwidth and if the absolute difference is greater than the threshold value then, adjusting the current set bandwidth.

4. The method of claim 1, wherein there are a plurality of TE tunnels, the method further comprises the step of tagging the TE tunnels in which the dynamic bandwidth adjustment is to be performed.

5. The method of claim 1, further comprises the steps of:

determining a delta, which is a difference between the actual traffic flow and the current set bandwidth;

determining a passage of time since a last update of the current set bandwidth; and using a percentage of the delta to update the current set bandwidth if the passage of time is less than a predetermined amount of time, wherein the percentage is dependent on the length of the passage of time.

6. A processor readable medium having instructions contained therein for controlling a Multiprotocol Label Switching (MPLS) traffic engineering (TE) system by dynamically adjusting a current set bandwidth of a TE tunnel, the instructions which when executed by the processor causes the processor to perform a method comprising the repetitive steps of:

setting an event in which a byte counter is to be read, the byte counter keeping track of an average traffic flow through the TE tunnel; wherein at the occurrence of the event, a processing unit performs the steps of:

reading the byte counter to determine the average traffic flow of the TE tunnel;

comparing the average traffic flow with the current set bandwidth of the TE tunnel;

determining whether the current set bandwidth needs to be adjusted and if so, calculating an adjusted bandwidth and causing a TE module to perform the steps of, calculating a path that meets a requirement of the adjusted bandwidth; and setting the TE tunnel according to the calculated path.

7. The processor readable medium of claim 6, the method further comprises the steps of:

setting a global timer with a first periodic interval in which the byte counter is to be read, wherein at the end of each first periodic interval, the processing unit performs the steps of, retrieving a byte counter value from the byte counter;

comparing the byte counter value with a previously stored byte counter value in a memory;

storing the greater of the two values in the memory; and setting a per tunnel timer with a second periodic interval in which the byte counter is to be read, wherein at the end of second periodic interval, the processing unit performs the step of retrieving the byte counter value from the byte counter to be compared with the current set bandwidth.

8. The processor readable medium of claim 6, the method further comprises the steps of:

storing a threshold value in a memory;

setting a global timer with a first periodic interval in which the byte counter is to be read, wherein at the end of each first periodic interval, the processing unit performs the steps of, retrieving a byte counter value from the byte counter;

ascertaining a difference between the byte counter value and the current set bandwidth and if the absolute difference is greater than the threshold value then, adjusting the current set bandwidth.

9. The processor readable medium of claim 8, wherein there are a plurality of TE tunnels, the method further comprises the step of tagging the TE tunnels in which the dynamic bandwidth adjustment is to be performed.

10. The processor readable medium of claim 6, further comprises the steps of:

determining a delta, which is a difference between the actual traffic flow and the current set bandwidth;

determining a passage of time since a last update of the current set bandwidth; and using a percentage of the delta to update the current set bandwidth if the passage of time is less than a predetermined amount of time, wherein the percentage is dependent on the length of the passage of time.

11. An apparatus to control a Multiprotocol Label Switching (MPLS) traffic engineering (TE) system by dynamically adjusting a current set bandwidth of a TE tunnel, the apparatus comprising:

an autobandwidth module to set an event in which a byte counter is to be read, the byte counter keeping track of an average traffic flow through the TE tunnel;

a processing unit, which at the occurrence of the event, is configured (1) to read the byte counter to determine the average traffic flow of the TE tunnel, (2) to compare the average traffic flow with the current set bandwidth of the TE tunnel, (3) to determine whether the current set bandwidth needs to be adjusted, a TE module, which if the current set bandwidth needs to be adjusted, is configured (1) to calculate a path that meets the adjusted bandwidth, and (2) to set the TE tunnel according to the calculated path.

12. The apparatus of claim 11, further comprises:
the autobandwidth module further including
  a global timer with a first periodic interval in which the byte counter is to be read;
  wherein the processing unit, in which at the end of each first periodic interval, is configured to,
    (1) retrieve a byte counter value from the byte counter,
    (2) compare the byte counter value with a previously stored byte counter value in a memory,
    (3) store the greater of the two values in the memory, and the autobandwidth module further including
  a per tunnel timer with a second periodic interval in which the byte counter is to be read;
    wherein the processing unit, in which at the end of the second periodic interval, is configured to retrieve the byte counter value from the byte counter to be compared with the current set bandwidth.

13. The apparatus of claim 11, further comprising:
the autobandwidth module further including
  a global timer with a first periodic interval in which the byte counter is to be read;
  a memory to store a threshold value;
  wherein at the end of each first periodic interval, the processing unit is configured
    (1) to retrieve a byte counter value from the byte counter,
    (2) to ascertain a difference between the byte counter value and the current set bandwidth and if the absolute difference is greater than the threshold value then, the TE module is configured to adjust the current set bandwidth.

14. The apparatus of claim 13, wherein there are a plurality of TE tunnels, the apparatus further comprising means for tagging the TE tunnels in which the dynamic bandwidth adjustment is to be performed.

15. The apparatus of claim 11, further comprises:
  means for determining a delta, which is a difference between the actual traffic flow and the current set bandwidth;
  means for determining a passage of time since a last update of the current set bandwidth; and
  the TE module configured to use a percentage of the delta to update the current set bandwidth if the passage of time is less than a predetermined amount of time, wherein the percentage is dependent on the length of the passage of time.

16. A method in a router for establishing label switched paths, comprising:
  selecting a first bandwidth for a first route;
  choosing said first route to accommodate packets switched according to said label switched paths;
  establishing a first tunnel for said first route, said first tunnel having said first bandwidth;
  monitoring a number of bytes passing through said first tunnel to measure a measured bandwidth;
  selecting, in response to said measured bandwidth, a second route for said label switched paths, said second route accommodating said measured bandwidth; and
  establishing a second tunnel for said second route.

17. The method as in claim 16 further comprising:
  changing said first bandwidth of said first tunnel to create said second tunnel.

18. The method as in claim 16 further comprising:
  establishing a new tunnel as said second tunnel, said second tunnel using said second route;
  moving flows from said first tunnel to said second tunnel; and, tearing down said first tunnel.

19. The method as in claim 16 further comprising:
  establishing a new tunnel as said second tunnel in the event that said first route is different from said second route, said second tunnel using said second route;
  moving flows from said first tunnel to said second tunnel; and, tearing down said first tunnel.

20. The method as in claim 16 further comprising:
  counting bytes passing through said first tunnel at a first time and saving a first number of bytes counted;
  counting bytes passing through said first tunnel at a later time and saving a second number of bytes counted;
  computing a difference in response to said first number of bytes and said second number of bytes;
  comparing said difference with a threshold;
  creating said second tunnel only if said difference exceeds said threshold.

21. The method of claim 20 wherein said step of computing a difference in response to said first number of bytes and said second number of bytes, further comprises:
  computing said difference by subtracting said first number of bytes from said second number of bytes.

22. The method as in claim 20 further comprising:
  selecting a second bandwidth for said second route in response to a time interval between said first time and said later time.

23. The method as in claim 20 further comprising;
  determining a bandwidth delta in response to said first bandwidth and said difference;
  selecting a second bandwidth for said second route in response to said first bandwidth and said delta.

24. The method as in claim 20 further comprising;
  determining a bandwidth delta in response to said first bandwidth and said difference;
  selecting said second bandwidth by adding a percentage of said delta to said first bandwidth in accordance with the following table,
    time interval one minute, add 20% of said delta,
    time interval two minutes, add 40% of said delta,
    time interval three minutes, add 60% of said delta,
    time interval four minutes, add 80% of said delta,
    time interval five minutes, add 100% of said delta.

25. The method of claim 16 further comprising:
  saving a first number of bytes counted passing through said first tunnel after a last change in bandwidth;
  periodically counting bytes passing through said first tunnel to measure a second number of bytes;
  comparing a difference between said first number and said second number with a threshold;
  establishing said second tunnel in the event that said difference exceeds said threshold.

26. The method of claim 25 further comprising:
  selecting a larger bandwidth than said first bandwidth for said second route in the event that said first number of bytes and said second number of bytes indicates a larger bandwidth than said first bandwidth.

27. The method of claim 25 further comprising:
  selecting a smaller bandwidth than said first bandwidth for said second route in the event that said first number of bytes and said second number of bytes indicates a smaller bandwidth than said first bandwidth.

28. The method of claim 25 further comprising:
  selecting a smaller bandwidth than said first bandwidth for said second route in the event that said first number of bytes and said second number of bytes indicates a smaller bandwidth than said first bandwidth; and, changing a bandwidth of said first tunnel to create said second tunnel.

29. A traffic engineering system in a router to establish label switched paths, comprising:

a first module to select a first bandwidth for a first route;

a path calculation module to choose said first route to accommodate packets switched according to said label switched paths;

a second module to establish a first tunnel for said first route, said first tunnel having said first bandwidth;

a physical link management module to monitor a number of bytes passing through said first tunnel to measure a measured bandwidth;

a traffic engineering module to select, in response to said measured bandwidth, a second route for said label switched paths, said second route accommodating said measured bandwidth; and a third module to establish a second tunnel for said second route.

30. The apparatus as in claim 29, further comprising:

said third module is said second module.

31. The apparatus as in claim 29, further comprising:

a module to change said first bandwidth of said first tunnel to create said second tunnel.

32. The apparatus as in claim 29, further comprising:

a module to establish a new tunnel as said second tunnel, said second tunnel using said second route;

a physical link management module to move flows from said first tunnel to said second tunnel; and, a fourth module to tear down said first tunnel.

33. The apparatus as in claim 29, further comprising:

a fifth module to establish a new tunnel as said second tunnel in the event that said first route is different from said second route, said second tunnel using said second route;

a physical link management module to move flows from said first tunnel to said second tunnel; and, a fourth module to tear down said first tunnel.

34. The apparatus as in claim 29, further comprising:

a physical link management module to count bytes passing through said first tunnel at a first time and saving a first number of bytes counted, said a physical link management module counting bytes passing through said first tunnel at a later time and saving a second number of bytes counted;

a fourth module to compute a difference in response to said first number of bytes and said second number of bytes;

a comparison module to compare said difference with a threshold;

a fifth module to establish a new tunnel as said second tunnel only if said difference exceeds said threshold.

35. The apparatus as in claim 34, further comprising:

said fourth module computing said difference by subtracting said first number of bytes from said second number of bytes.

36. The apparatus as in claim 34, further comprising:

a sixth module to select a second bandwidth for said second route in response to a time interval between said first time and said later time.

37. The apparatus as in claim 34, further comprising:

a CPU to determine a bandwidth delta in response to said first bandwidth and said difference;

a sixth module to select a second bandwidth for said second route in response to said first bandwidth and said delta.

38. The apparatus as in claim 34, further comprising:

a CPU to determine a bandwidth delta in response to said first bandwidth and said difference;

a module to select said second bandwidth by adding a percentage of said delta to said first bandwidth in accordance with the following table, time interval one minute, add 20% of said delta,
time interval two minutes, add 40% of said delta,
time interval three minutes, add 60% of said delta,
time interval four minutes, add 80% of said delta,
time interval five minutes, add 100% of said delta.

39. The apparatus as in claim 29, further comprising:

a physical link management module to save a first number of bytes counted passing through said first tunnel after a last change in bandwidth, said physical link management module periodically counting bytes passing through said first tunnel to measure a second number of bytes;

a fourth module to compare a difference between said first number and said second number with a threshold;

a fifth module to establish said second tunnel in the event that said difference exceeds said threshold.

40. The apparatus as in claim 39, further comprising:

a traffic engineering module to select a larger bandwidth than said first bandwidth for said second route in the event that said first number of bytes and said second number of bytes indicates a larger bandwidth than said first bandwidth.

41. The apparatus as in claim 39, further comprising:

a traffic engineering module to select a smaller bandwidth than said first bandwidth for said second route in the event that said first number of bytes and said second number of bytes indicates a smaller bandwidth than said first bandwidth.

42. The apparatus as in claim 39, further comprising:

a traffic engineering module to select a smaller bandwidth than said first bandwidth for said second route in the event that said first number of bytes and said second number of bytes indicates a smaller bandwidth than said first bandwidth; and, a sixth module to change a bandwidth of said first tunnel to create said second tunnel.

43. A router to establish a tunnel for label switched paths, comprising:

a first module to select a first bandwidth for a first route;

a second module to choose said first route to accommodate packets switched according to said label switched paths;

a third module to establish a first tunnel for said first route, said first tunnel having said first bandwidth;

means for monitoring a number of bytes passing through said first tunnel to measure a measured bandwidth;

means for selecting, in response to said measured bandwidth, a second route for said label switched paths, said second route accommodating said measured bandwidth; and a fourth module to establish a second tunnel for said second route.

44. A computer readable media, comprising:

said computer readable media containing instructions for execution in a processor for the practice of the method of claim 1 or claim 16.

45. Electromagnetic signals propagating on a computer network, comprising:

said electromagnetic signals carrying instructions for execution on a processor for the practice of the method of claim 1 or claim 16.

* * * * *